United States Patent [19]
Hull

[11] Patent Number: 5,563,565
[45] Date of Patent: Oct. 8, 1996

[54] METHOD FOR OBTAINING LARGE LEVITATION PRESSURE IN SUPERCONDUCTING MAGNETIC BEARINGS

[75] Inventor: John R. Hull, Hinsdale, Ill.

[73] Assignee: University of Chicago, Chicago, Ill.

[21] Appl. No.: 156,429

[22] Filed: Nov. 23, 1993

[51] Int. Cl.$^6$ ....................................................... H02K 7/09
[52] U.S. Cl. ........................................... 335/216; 310/90.5
[58] Field of Search ........................... 335/216; 310/90.5; 505/1, 879, 903

[56] References Cited

U.S. PATENT DOCUMENTS

| | | |
|---|---|---|
| 3,026,151 | 3/1962 | Buchhold . |
| 3,493,274 | 2/1970 | Emslie et al. . |
| 4,132,130 | 1/1979 | Schneider . |
| 4,870,310 | 9/1989 | Triplett . |
| 4,886,778 | 12/1989 | Moon et al. . |
| 4,939,120 | 7/1990 | Moon et al. . |
| 4,961,352 | 10/1990 | Downer et al. . |
| 5,012,216 | 4/1991 | Jin .......................................... 335/216 |
| 5,177,387 | 1/1993 | McMichael et al. ................... 310/90.5 |
| 5,214,981 | 6/1993 | Weinberger et al. . |
| 5,270,601 | 12/1993 | Rigney, II .............................. 310/90.5 |
| 5,330,967 | 7/1994 | Takahata et al. ....................... 505/166 |

OTHER PUBLICATIONS

"Satellite Power Using a Magnetically Suspended Flywheel Stack," Kirk et al., *Journal of Power Sources*, vol. 22 (1988), pp. 301–311.
"Magnetic Forces in High–$T_c$ Superconducting Bearings," Moon, *Applied Electromagnetics in Materials*, vol. 1 (1990), pp. 29–35.
"High–Speed Rotation of Magnets on High $T_c$ Superconducting Bearings," Moon, et al., *Appl. Phys. Lett.*, vol. 56(4), Jan. 22, 1990, pp. 397–399.
"Rotor Dynamics of Flywheel Energy Storage Systems," Jayaraman, et al, *Journal of Solar Energy Engineering*, vol. 113, Feb. 1991, pp. 11–18.

"A New Process with the Promise of High $J_c$ in Oxide Superconductors," Murakami, et al., *Japanese Journal of Applied Physics*, vol. 28, No. 7, Jul. 1989, pp. 1189–1194.
"Levitation Forces, Relaxation and Magnetic Stiffness of Melt–Quenched YBa$_2$Cu$_3$O$_x$," Moon, et al., *Japanese Journal of Applied Physics*, vol. 29, No. 7, Jul. 1990, pp. 1257–1258.
"Magnetic bearings using high–temperature superconductors: some practical considerations," Weinberger, et al., *Supercond. Sci. Technol.* 3 (1990) pp. 381–388.
"Characterization of Composite High Temperature Superconductors for Magnetic Bearing Applications," Weinberger, et al., Invited paper presented at 1990 Applied Superconductivity Conf., Snowmass village, Co, Sep. 24–28, 1990.
"Stability Projections for High Temperature Superconductors," Laquer, et al., *IEEE Transactions on Magnets*, vol. 25, No. 2, pp. 1516–1519, Mar. 1989.
"Amplitude dependence of magnetic stiffness in bulk high–temperature superconductors," Basinger, et al., *Appl. Phys. Lett.* 57(27), pp. 2942–2944, Dec. 31, 1990.
"Levitation force and magnetic stiffness in bulk high–temperature superconductors," Change, et al., *Journal of Applied Physics* 67(9), pp. 4358–4360, May 1, 1990.
"Phenomenology of Forces Acting Between Magnets and Superconductors," Hull, et al., Proceedings of the 25th Intersociety Energy Conversion Engineering Conference, vol. 3, IECEC–90, Aug. 12–17, 1990, Reno, NV.

(List continued on next page.)

Primary Examiner—Leo P. Picard
Assistant Examiner—Raymond M. Barrera
Attorney, Agent, or Firm—Reinhart, Boerner, Van Deuren, Norris & Rieselbach, s.c.

[57] ABSTRACT

A method and apparatus for compressing magnetic flux to achieve high levitation pressures. Magnetic flux produced by a magnetic flux source travels through a gap between two high temperature superconducting material structures. The gap has a varying cross-sectional area to compress the magnetic flux, providing an increased magnetic field and correspondingly increased levitation force in the gap.

14 Claims, 1 Drawing Sheet

OTHER PUBLICATIONS

"Materials Research Issues in Superconducting Levitation and Suspension As Applied to Magnetic Bearings," Moon, et al, Proceedings of the 25th Intersociety Energy Conversion Engineering Conference, vol. 3, IECEC–90, Aug. 12–17, 1990, Reno, NV.

"Characterization of Composite High Temperature Superconductors for Magnetic Bearing Applications", Weinberger et al., *IEEE Trans Magn.*, vol. 27, Mar. 1991.

METHOD FOR OBTAINING LARGE LEVITATION PRESSURE IN SUPERCONDUCTING MAGNETIC BEARINGS

CONTRACTUAL ORIGIN OF THE INVENTION

The United States Government has rights in this invention pursuant to Contract No. W-31-109-ENG-38 between the U.S. Department of Energy and The University of Chicago, representing Argonne National Laboratory.

BACKGROUND OF THE INVENTION

The present invention relates generally to a method and apparatus for increasing levitation pressure in superconducting magnetic bearings. More particularly, the present invention relates to a method and apparatus for producing large levitational pressures in superconducting magnetic bearings including a permanent magnet and a superconducting material. One preferred embodiment of the invention utilizes large flux pinning forces in superconductors to achieve compression of the flux emerging from permanent magnets or other magnetic flux producing devices. The compressed flux produces a large magnetic field, which results in large magnetic pressures.

The stable levitation of a permanent magnet over a sample of ceramic superconductor in a container of liquid nitrogen is well known and represents the rapidly advancing technology associated with high-temperature superconductivity. The use of this levitation force in magnetic bearing applications is thought to comprise one of the earliest applications of the high-temperature superconductors, because for these applications there is generally no need for current to flow between individual grains of the high temperature superconductor. Rather, the magnetization properties within individual grains are important, and such magnetization has exhibited some very high values since the early days of the high temperature superconductor discoveries.

The levitation pressure P of a magnetic interaction on any surface can be calculated to a first approximation by $$P=(B_t^2-B_n^2)/2\mu_o, \quad (1)$$

where $\mu_o=4\pi\times10^{-7}$ Tm/A(T$^2$/Pa) is the permeability of free space, B is the magnetic induction (typically referred to herein as the magnetic field), subscript "t" refers to the tangential field component, and subscript "n" refers to the normal field component. The magnetic induction is related to magnetic flux $\Phi$ according to the relation:

$$B=\Phi/A, \quad (2)$$

where A is the cross-sectional area of any imaginary or real surface through which the magnetic flux passes.

It has conventionally been believed that the maximum levitation pressure obtainable in a permanent magnet/high temperature superconducting material system is given by the value of B measured at a pole face of the permanent magnet. The measured pole face field is of the order of 0.5 T or less for most geometries and state-of-the-art permanent magnets. The associated magnetic pressure of a 0.5 T field is 100 kPa (1 arm or ~15 psi). This magnetic pressure is approximately equal to that produced in conventional gas-film bearings, but is significantly less than that of liquid film bearings or roller bearings. Nevertheless, for cryogenic applications, where mechanical wear is very high and where thermal losses associated with contact produce large refrigeration penalties, gas-film bearings are presently in use or development. It is for these applications that magnetic bearings with their total absence of contact have an immediate advantage. Further, high temperature superconductor magnetic bearings can even provide advantages over state of the art magnetic bearings if larger levitation pressures can be achieved.

The conventional wisdom previously described regarding the maximum levitational pressure obtainable has been shown herein to be an artificially low level which has been overcome by the instant invention. The unique method and apparatus of the invention uses flux compression to generate larger levitation pressures than previously believed practical.

It is therefore an object of the invention to provide a novel method and apparatus for obtaining maximum possible levitational force in a system comprising a magnet and a high temperature superconducting material.

It is a further object of the invention to provide an improved device and method in which a superconducting material structure is used to compress flux emerging from a permanent magnet to provide high magnetic field strength in one or more confined regions.

It is a still further object of the invention to provide a novel superconducting magnetic bearing and method of use which is passively stable.

It is yet another object of the invention to provide an improved superconducting magnetic bearing and method of use which compresses magnetic flux and generates large levitation forces using a substantially horizontal, diamagnetic superconducting material.

Other advantages and features of the invention, together with the organization and the manner of operation thereof, will become apparent from the following detailed description when taken in conjunction with the accompanying drawings, wherein like elements have like numerals throughout the drawings.

DETAILED DESCRIPTION OF PREFERRED EMBODIMENTS

Figure 1:
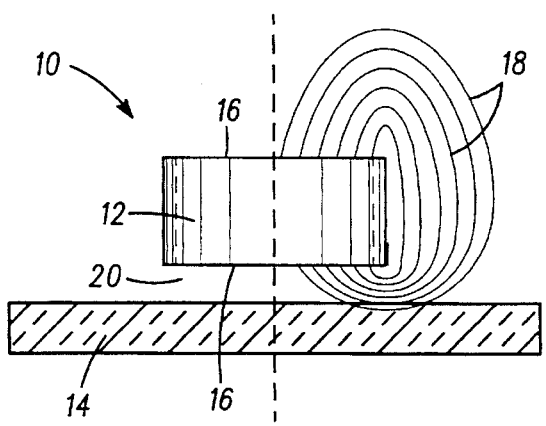
FIG. 1 illustrates a plan view of a permanent magnet levitated above a high temperature superconductor material disk.

Referring to the figures and more particularly to FIG. 1, a bearing 10 comprising a permanent magnet cylinder 12 is shown levitated above a high temperature superconductor disk 14. The permanent magnet cylinder 12 has magnetic poles 16 on its top and bottom surfaces. Flux lines 18 that emerge from the poles 16 (shown only on the right half of the figure) ordinarily have the spatial distribution shown coming from the top pole 16. The superconductor disk 14 distorts the spatial flux distribution flux lines 18 coming from the bottom of the permanent magnet cylinder 12. In FIG. 1, some of the magnetic flux lines 18 penetrate the high temperature superconductor disk 14 as shown. As the flux pinning strength of the high temperature superconductor disk 14 is improved, less flux penetrates the high temperature superconductor disk 14 and more flux resides in the gap 20 between the high temperature superconductor disk 14 and the permanent magnet cylinder 12.

It is believed that for the geometry shown in FIG. 1, the levitational pressure is limited by a value of B equal to the intrinsic coercive force $H_{ci}$ associated with the permanent magnet cylinder 12. As can be seen in FIG. 1, the flux density between the permanent magnet cylinder 12 and the high temperature superconductor disk 14 increases toward the perimeter of the permanent magnet cylinder 12. If the flux density exceeds $H_{ci}$, the permanent magnet cylinder 12 will lose its magnetization. For many magnetic materials, $H_{ci}$ has a value greater than 2 T, and thus there appears to be an unfulfilled potential for producing magnetic levitation pressures of 1.6 MPa (16 atm.). This can be compared to atmospheric pressure from a pole face field previously believed to be the maximum achievable level. As described hereinbelow, significantly larger pressures are in fact obtainable with preferred embodiments of the invention.

In order for a high temperature superconductor to provide a large levitational pressure, it must act essentially as a good diamagnetic material. It cannot do this with the Meissner effect because the first critical field $HC_1$ is of the order of 10 mT. However, if the high temperature superconductor material has good flux pinning properties, then as the permanent magnet is brought toward the high temperature superconductor surface, the flux lines are held near the surface of the high temperature superconductor and the flux lines near the surface are all tangential to the surface; the high temperature superconductor acts essentially as a diamagnet. The large tangential component can substantially increase the levitation pressure as shown by reference to Equation (1) hereinabove.

In the early days of high temperature superconductor materials research, the flux pinning forces were determined to be quite weak, and the magnetic field was determined to penetrate the superconductor at field strengths considerably below 1 T. That is, in Equation (1), there was a substantial normal component; and the magnetic pressures were much lower than that between two identical permanent magnets. For this reason, the discrepancy with conventional wisdom was not noted in the past. Currently, however, high temperature superconductor materials, especially those of the melt-textured variety and its derivatives, often exhibit substantial diamagnetic behavior in fields up to 1 T. Therefore, material fabrication techniques have improved, flux pinning strength has increased further, thereby increasing the effectiveness of the present invention.

Figure 2:
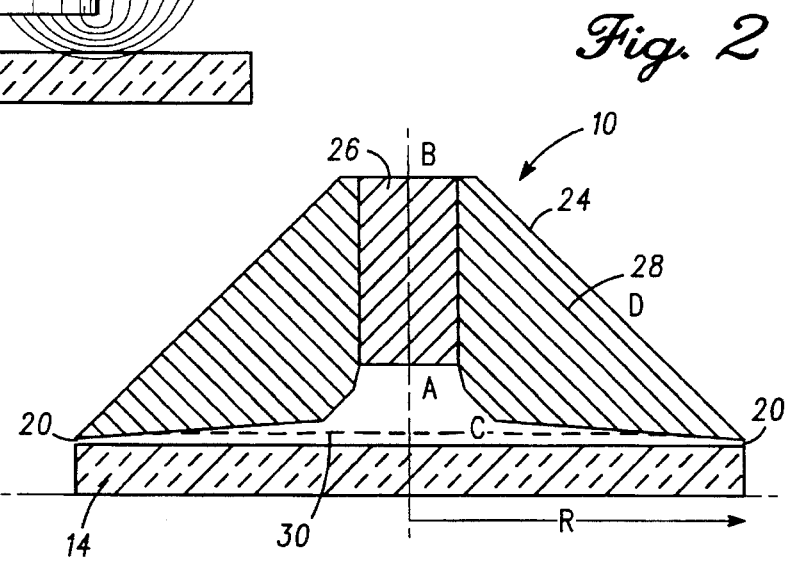
FIG. 2 shows a cross-sectional plan view of a thrust bearing rotor levitated above a high temperature superconductor material disk.

A preferred embodiment of the invention is shown in FIG. 2. A bearing 10 includes a high temperature superconductor disk 14 located beneath a thrust bearing rotor 24. The thrust bearing rotor 24 comprises a cylindrical permanent magnet 26 and high temperature superconductor annular structure 28, and these elements are mechanically coupled to form the rotor 24. The magnet 26 is magnetized with poles located at A and B. The flux emerging at pole face A is channeled through region C between the rotor 24 and high temperature superconductor disk 14, and then returns to the magnet 26 via region D and reenters the magnet 26 at pole face B. If the gap 20 between the rotor 24 and disk 14 is small, then the magnetic field is much larger in region C than near pole face A. As illustrated in FIG. 2, the gap 20 in region C decreases radially so that the magnetic field is nearly constant along the surface of the high temperature superconductor disk 14.

The high temperature superconductor disk 14 and the high temperature superconductor annular structure 28 concentrate or compress the magnetic flux in region C. If the flux pinning of these high temperature superconductor components is large enough, almost all of the flux will be located in region C. By making the gap 20 small, the magnetic field strength and levitation pressure can be made very large in this region.

Ultimately, the levitation pressure is limited by the upper critical field of the superconductor $H_{c2}$, which is a function of temperature. At liquid helium and liquid hydrogen temperatures, $H_{c2}$ is approximately 100 T. At liquid nitrogen temperature, $H_{c2}$ may be several tens of Tesla. A more practical limitation can be the magnetic field at which flux jumps are expected to occur (i.e., the field will penetrate the high temperature superconductor because of thermal-magnetic instabilities). For a high temperature superconductor with a critical temperature of 90K, the field at which flux jumps can be expected to occur is believed to be as high as about 8 T.

Another preferred embodiment of the invention can use an electromagnet in place of the permanent magnet cylinder 12 (FIG. 1) or the cylindrical permanent magnet 26 (FIG. 2) previously described. Yet another embodiment uses a superconducting magnet in persistent current mode in place of the various permanent magnets. Another embodiment uses a trapped field superconductor in place of the various permanent magnets. Still another preferred embodiment uses a combination of permanent magnet and pole piece, made of holmium, iron or other magnetic material with a high saturation field. In these devices, the pole piece concentrates the flux from the permanent magnet. This latter embodiment can be used in the geometry of FIG. 1 or FIG. 2.

Yet another preferred embodiment utilizes a generally flat bottom surface 30 of the high temperature superconductor annular structure 28 (shown in phantom in FIG. 2) which might be easier to fabricate. However, less levitational force results because the magnetic field in the gap decreases with increasing radius.

Figure 3:
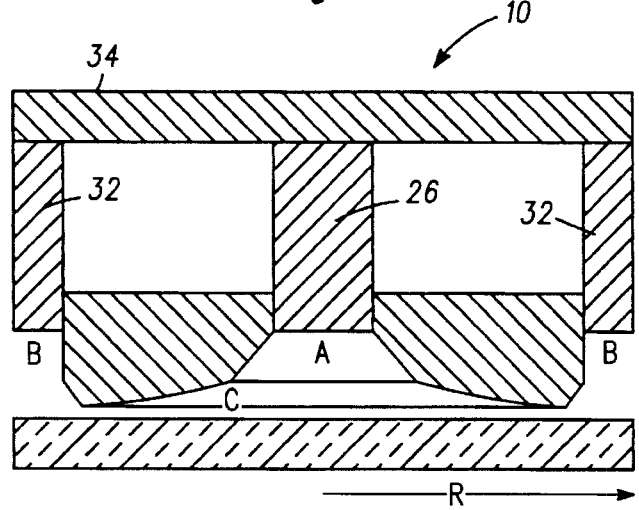
FIG. 3 illustrates a cross-sectional plan view of a rotor comprising an annular permanent magnet and high temperature superconductor material structure connected to an iron disk and levitated above a high temperature superconductor material disk.

Yet another preferred embodiment of one form of the invention is shown in FIG. 3. Here the bearing 10 provides a flux return path aided by an additional annular permanent magnet 32 and an iron disk 34. This has the practical advantage of increasing the flux density at pole face A. This raises the field strength in region C, or alternatively, increases the size of the gap 20 at C which can still produce a given levitation pressure. Preferably, the pole face at B has the opposite polarity as that at A, and the area of the pole at B is approximately the same as that at A. An alternative embodiment of this form of the invention replaces the annular permanent magnet 32 with an iron annulus.

Figure 4:
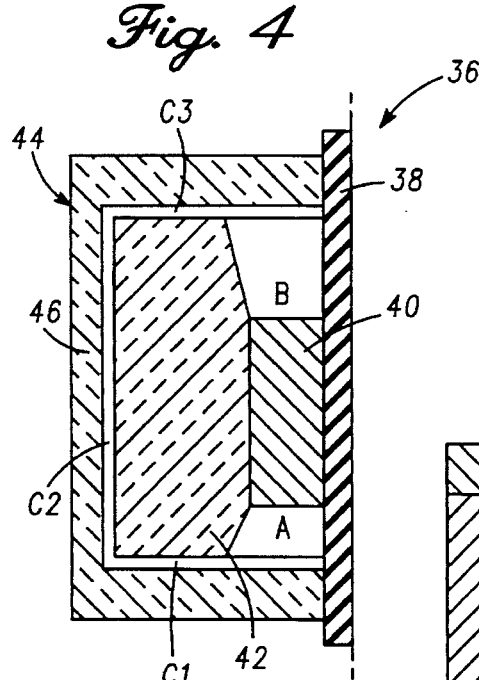
FIG. 4 shows a cross-sectional plan view of a rotor comprising a nonmagnetic shaft, permanent magnetic and annular high temperature superconductor material capable of rotation within a high temperature superconductor material housing stator.

Another preferred embodiment of the invention is illustrated in FIG. 4. In this design, the bearing 10 includes a rotor 36 preferably comprising a nonmagnetic shaft 38, permanent magnet 40, and high temperature superconductor annular part 42. A stator 44 comprises a high temperature superconductor part 46. The magnetic flux takes the path along spaces A, C1,C2,C3,B. The advantage of this design is that the bearing 10 is stable in both the vertical and radial direction without the need for any flux to penetrate the high temperature superconductor components. A movement downward by the rotor causes the gap C1 to decrease and the gap C3 to increase in size. The change in gap size causes the magnetic field and levitation pressure to increase in C1 and decrease in C3. A movement of the rotor to the left will cause gap C2 to decrease and the corresponding gap to the right to increase, with corresponding changes in radial levitation pressure. Thus, the bearing is stable in an equilibrium position without any feedback controls. In FIG. 4, the bearing is illustrated in a thrust bearing configuration. If the device is turned on its side, then the bearing 10 will function equally well as a journal bearing.

As a separate alternative embodiment of FIG. 4, part or all of the shaft 11 can be made from high temperature superconductor material. This increases the reluctance outside the desired flux path.

Increased stability in the other preferred embodiments described herein can be achieved by having some of the magnetic flux penetrate the high temperature superconductor and be pinned inside. This produces stability with regard to lateral motions. However, this stability is gained at the expense of some levitational pressure perpendicular to the high temperature superconductor surface.

While preferred embodiments have been illustrated and described, it should be understood that changes and modifications can be made therein without departing from the invention in its broader aspects. Various features of the invention are defined in the following claims.

What is claimed is:

1. A method of compressing magnetic flux using high temperature superconductors to achieve high levitation pressures, comprising the steps of:

providing a magnetic flux source;

locating a second integral element composed of a high temperature superconductor material vertically below said magnetic flux source;

locating at least a first, integral element composed of a high temperature superconducting material and capable of substantially diamagnetic behavior in a position displaced horizontally adjacent and in contact with said magnetic flux source;

providing a gap, through which at least a portion of magnetic flux produced by said magnetic flux source will travel, substantially between said first and second high temperature superconducting material elements, said gap having a varying cross-sectional area to compress said magnetic flux; and providing an increased magnetic field and correspondingly increased levitation force in said gap by the compressing of said magnetic flux.

2. The method as described in claim 1, further including the step of varying said cross-sectional area of said gap to compress the magnetic flux to achieve a substantially uniform levitation force in said gap.

3. The bearing as defined in claim 1, wherein said magnetic flux source means is disposed for rotation with said first integral element.

4. A method of compressing magnetic flux using high temperature superconductors to achieve high levitation pressures, comprising the steps of:

providing a magnetic flux source;

locating a second integral substantially circular element composed of a high temperature superconductor material vertically below said magnetic flux source;

locating at least a first, integral substantially circular element composed of a high temperature superconducting material and capable of substantially diamagnetic behavior in a position displaced horizontally adjacent, and coupled for rotation with said magnetic flux source;

providing a gap having at least a portion defined by said high temperature superconducting elements, through which at least a portion of magnetic flux produced by said magnetic flux source will travel, said gap having a decreasing cross-sectional area as a function of increasing distance from said magnetic flux source to compress said magnetic flux; and providing an increased magnetic field and correspondingly increased levitation force in said gap by the compressing of said magnetic flux.

5. A high temperature superconducting material bearing, comprising:

magnetic flux source means for producing magnetic flux coupled for rotation with, and located in an interior portion of, a first high temperature superconducting material means composed of an integral shape;

a second high temperature superconducting material means located adjacent said magnetic flux source means;

said first high temperature superconducting material means and said second high temperature superconducting material means exhibiting substantially diamagnetic behavior; and said first high temperature superconducting material means and said second high temperature superconducting material means defining a gap therebetween which decreases in cross-sectional area as distance from said magnetic flux source means increases.

6. The bearing as defined in claim 5, wherein at least one of said high first temperature superconducting material means and said second high temperature superconducting material means are substantially circular.

7. The bearing as defined in claim 5, wherein said magnetic flux source means comprises a permanent magnet.

8. The bearing as defined in claim 7, wherein said permanent magnet includes a plurality of pole faces of substantially equal cross-sectional area.

9. The bearing as defined in claim 5, wherein said gap decreases substantially linearly in cross-sectional area as distance from said magnetic flux source means increases.

10. A high temperature superconducting material bearing, comprising:

magnetic flux source means for producing magnetic flux coupled for rotation with, and located in an interior portion of, a first high temperature superconducting material means composed of an integral shape;

wherein said first high temperature superconducting material means and said magnetic flux source means form an integral trait disposed for rotation;

a second high temperature superconducting material means located adjacent said magnetic flux source means;

said first high temperature superconducting material means and said second high temperature superconducting material means exhibiting substantially diamagnetic behavior; and said first high temperature superconducting material means and said second high temperature superconducting material means defining a gap therebetween which decreases in cross-sectional area as distance from said magnetic flux source means increases.

11. A high temperature superconducting material bearing, comprising:

a magnetic flux source structure coupled for rotation with, and located in an interior portion of, a first high temperature superconducting material structure;

a second high temperature superconducting material structure located adjacent said magnetic flux source structure;

said first high temperature superconducting material structure and said second high temperature superconducting material structure exhibiting substantially diamagnetic behavior; and said first high temperature superconducting material structure and said second high temperature superconducting material structure defining a gap therebetween which decreases in height as distance from said magnetic flux source structure increases.

12. A high temperature superconducting material bearing, comprising:

a magnetic flux source structure directly coupled for rotation with and located in an interior portion of, a first high temperature superconducting material structure;

a second high temperature superconducting material structure located adjacent said magnetic flux source structure;

said first high temperature superconducting material structure and said second high temperature superconducting material structure exhibiting substantially diamagnetic behavior; and said first high temperature superconducting material structure and said second high temperature superconducting material structure defining a gap therebetween which substantially linearly decreases in cross-sectional area as distance from said magnetic flux source structure increases to provide a substantially constant magnetic field along said second high temperature superconducting material structure.

13. The bearing as defined in claim 12, wherein said gap decreases constantly in cross-sectional area as distance from said magnetic flux source structure increases.

14. A high temperature superconducting material bearing, comprising:

a magnetic flux source structure directly contacting, coupled for rotation with and located substantially in the center of a first high temperature superconducting material structure;

a second high temperature superconducting material structure located adjacent said magnetic flux source structure;

said first high temperature superconducting material structure and said second high temperature superconducting material structure exhibiting substantially diamagnetic behavior; and said first high temperature superconducting material structure and said second high temperature superconducting material structure defining a gap therebetween which decreases in cross-sectional area as distance from said magnetic flux source structure increases.

* * * * *